Nov. 3, 1964 J. A. HACKETT 3,155,922

OSCILLATOR FREQUENCY CONTROL WITH SWITCHING

Filed Nov. 21, 1961

INVENTOR
J. A. HACKETT
BY Roy M. Porter, Jr.
ATTORNEY

United States Patent Office 3,155,922

Patented Nov. 3, 1964

3,155,922

OSCILLATOR FREQUENCY CONTROL WITH SWITCHING

John A. Hackett, Old Bridge, N.J., assignor to Bell Telephone Laboratories, Incorporated, New York, N.Y., a corporation of New York Filed Nov. 21, 1961, Ser. No. 153,813
3 Claims. (Cl. 331—179)

This invention relates to frequency control of oscillators, to switching, and to systems for converting pulse signals to tone signals; more particularly it relates to stepwise frequency control of oscillators by means of coordinated switching.

An oscillator which can be quickly adjusted in steps to produce a number of different frequencies has a wide range of uses, extending from testing and measuring systems to communications systems. In a telephone system each frequency may correspond to a different digit used in the telephone dialing system. A special and unusually demanding example of this type of system is a centralized repertory dialing system which is designed to be compatible with other telephone multifrequency systems.

In a centralized repertory dialing system, the customer selects an entire telephone number in one motion and centralized automatic equipment does the dialing for him. The information generated by the customer is most advantageously transmitted by means of a pulse or set of pulses; but it is frequently necessary to actuate existing equipment by means of tones, that is, alternating current waves of discrete frequencies. A different tone or combination of tones must be used for every digit of the number that is desired to be dialed. Thus, the frequency or frequencies of an oscillator must be varied stepwise in a desired manner. For this purpose, sections of a tuning element are commonly switched in or out of a tuning circuit.

Tuning by switching is commonly done by mechanical means. Likewise, electromechanical crosspoint switching arrangements can be used, and are in fact used in telephone multifrequency systems.

However, since the customer generates an electrical signal, a saving of equipment is likely to result if all subsequent operations can be performed purely electrically. The saving is most substantial if the number of electrical signals used in tuning the oscillator can be minimized.

It is therefore an object of this invention to convert electrical pulse signals to electrical tone signals with a minimum of equipment.

A further object of the invention is to tune oscillators stepwise entirely electrically with pulse signals, preferably with a single pulse for each step.

A still further object of the invention is to vary the reactive and resistive components of an impedance by purely electrical switching.

The present invention takes unique advantage of the unusual characteristics of the semiconductor device known to the art as the PNPN triode switch. In particular, the PNPN triode switch has a regenerative characteristic and thus remains in the low or high impedance state even after the removal of the trigger pulse. However, it can be driven from the low impedance state to the high impedance state without a trigger pulse if deprived of a minimum current flow. According to the invention, a plurality of semiconductor switches with such characteristics are connected to various points in the tuning inductance of an oscillator, through which flows a direct current sufficient to supply the minimum current for only one of them. The tuning inductance is varied stepwise by a signal pulse which turns on one semiconductor switch, simultaneously removing from the tuned tank circuit of the oscillator a part of the inductance and turning off any other conducting semiconductor switch, which previously had removed from the tuned tank circuit another part of the tuning inductance, by depriving said other switch of its required minimum current.

In accordance with another feature of the invention, an impedance capable of sustaining direct-current flow is varied stepwise by a signal pulse which turns on one semiconductor switch, simultaneously removing the current flow from part of the impedance nad turning off any other conducting semiconductor switch, which was previously removing the current flow from another part of the impedance.

The nature of the present invention and other objects, features and advantages thereof will become more apparent from a consideration of the following detailed description and drawing in which.

Figure 1:
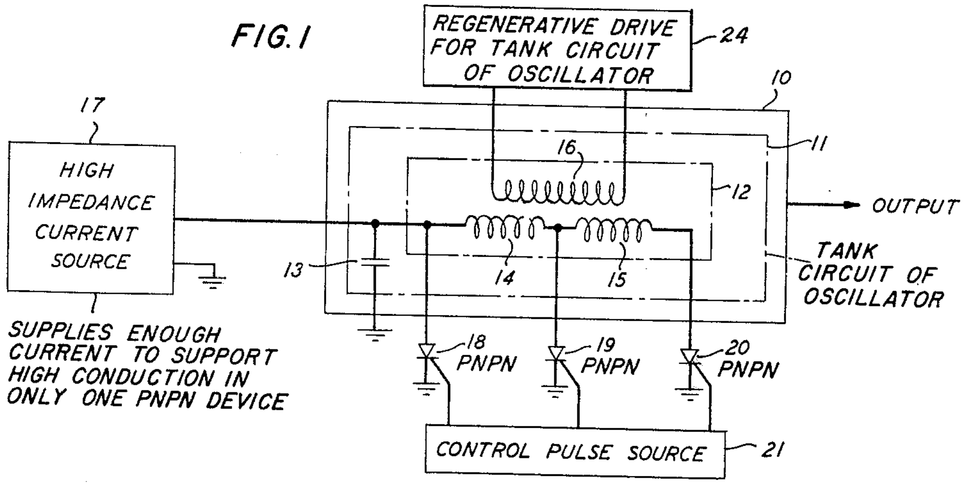
FIG. 1 is a schematic and block diagrammatic illustration of a specific embodiment of the invention.

The specific embodiment of FIG. 1 illustrates an oscillator comprising regenerative drive 24 and tuned tank circuit 11. It may be any type of oscillator which uses inductance-capacitance tuning. Of the oscillator components, only inductance-capacitance tuning ciruit 11 is involved in the cooperation which constitutes the principle of operation of the invention. Regenerative drive 24 of the oscillator includes, as is well known in the art, amplification, regenerative feedback, bias and limiting. If the amplifying device provides the limiting, the oscillator is known as self-limiting. Other forms of limiting are possible and will tend to decrease distortion of the sine wave output. The output of the oscillator may be taken from a great variety of points within the oscillator system.

The tuning inductance with tuning capacitance 13 creates an L-C or tuning circuit 11 to provide the resonance that is necessary for oscillations of a stabilized frequency.

The tuning inductance is composed of inductive sections 14 and 15, which are connected in series, and inductive section 16 which is connected with the regenerative drive circuitry 24 and which has only electromagnetic coupling with sections 14 and 15. The value of the tuning inductance can be determined from well-known physical principles. Sections 14 and 15 must carry a relatively heavy direct current, which is supplied by high impedance current source 17 in order to operate PNPN triode switches 18, 19, and 20. This direct current would complicate the biasing of regenerative drive 24 if caused to flow in inductive section 16. Therefore, inductive section 16 is isolated from the direct current by coupling it purely electromagnetically with sections 14 and 15. Any desired number of other inductive sections may be connected in series with sections 14 and 15. In a telephone system, at least ten such series-connected sections are desirable, since ten different frequencies corresponding to the digits are then easily produced.

PNPN triode switches 18, 19, and 20 provide a means of varying the inductance of tank circuit 11 by removing or inserting section 15 and a means of turning the oscillator on and off. Each can assume a high impedance state or a low impedance state. A description of the manufacture and characteristics of PNPN triode switching devices may be found in United States Patent 2,877,359, issued March 10, 1959, for the invention of I. M. Ross. Each of switches 18, 19, and 20 has its anode connected to a point in the series circuit of sections 14 and 15 and has its cathode connected to ground. This arrangement means that when one of the PNPN triodes is in a low impedance condition, all sections of the tuning inductance between its anode and ground are removed from tuned tank circuit 11. Each switch cathode might be returned to a different point in the oscillator system so long as the switch could effectively be caused to carry current without leading that same current through another one of the switches.

Control pulse source 21 supplies pulses to the control electrodes of semiconductor switches 18, 19, and 20 according to some desired informational sequence. In a centralized repertory dialing system, that sequence corresponds to the telephone number that the system has been commanded to dial. The pulses all are of a polarity to turn a switch on.

High impedance current source 17 supplies a substantially constant direct current to the series circuit illustrated by inductive sections 14 and 15 regardless of the number or impedance of the inductive sections. Thus, the direct-current resistance of source 17 should be high compared to the sum of the direct-current resistances of sections 14 and 15; and the inductance of source 17 should be high compared to the sum of the inductances of sections 14 and 15 and should have no electromagnetic coupling with them. The relationships just stated are ideal; generally, it is sufficient that the value of the current supplied by source 17 under all conditions is greater than the holding current of any one of the semiconductor switches 18, 19, and 20, which is designated as $I_H$ on curve 40 of FIG. 2, but is less than the sum of the $I_H$ values for any two of them. Even the latter requirement can be evaded to some degree when PNPN triode switches are used because such a device can be made to draw more current than its holding current with the initial aid of a control pulse from source 21.

Figure 2:
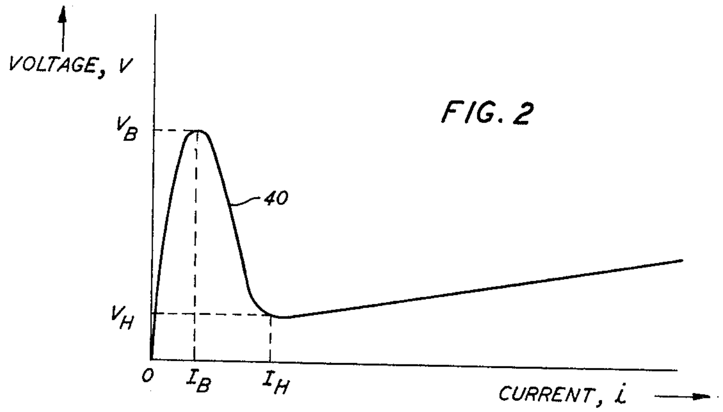
FIG. 2 shows a curve which is useful in understanding the theory and operation of the invention.

Each of PNPN semiconductor triode switches 18, 19, and 20 possesses a regenerative characteristic such that, when it is turned on by a pulse applied to its control electrode, it will stay on so long as it receives at least its holding current, which is designated as $I_H$ on curve 40 of FIG. 2. It is a low impedance device when so operating.

Switches 18, 19, and 20 can be turned on only by pulses applied to their control electrodes because the series circuit consisting of inductive sections 14 and 15 and high impedance current source 17 is arranged so that the voltage applied to the anode of each switch is always below the breakdown value for that switch which is designated as $V_B$ on curve 40 of FIG. 2. The alternating-current voltage variations appearing across sections 14 and 15 because of resonance in tuning circuit 11 can be held below $V_B$ by manipulating any one of a number of design parameters, such as the limiting values of the limiting circuits of regenerative drive circuit 24.

In the preferred embodiment of the invention, switches 18, 19, and 20 are identical since the voltage drops across sections 14 and 15 are small enough not to interfere with the principle of operation of the invention. That is, the sum of voltage drops across sections 14 and 15 are appreciably smaller than the breakdown voltage, $V_B$, of semiconductor switch 18. Methods of compensation for voltage drops across each section which are greater in relation to the breakdown voltage, $V_B$, than those found in the preferred embodiment and for certain other effects will be discussed in reference to FIG. 3.

In operation, only one of semiconductor switches 18, 19 and 20 can conduct at any given time because of the current-limiting effect of source 17, discussed above. Thus, the oscillator is either off or oscillating at a predictable frequency. For instance, if semiconductor switch 19 is conducting, then its anode is a virtual ground and section 15 of the tuning inductance is effectively removed from tuned tank circuit 11. Section 14, together with the coupling effect or mutual inductance of inductance 16, determines the tuning inductance of tank circuit 11. The tuning inductance resonates with tuning capacitance 13 to determine the output frequency of the oscillator. The alternating currents produced in inductive section 14 and capacitor 13 by resonance are small enough in relation to the current supplied by source 17 that semiconductor switch 19 is not deprived of its holding current. Semiconductor switches 18 and 20 are in their high impedance state, represented by the portion 0—$V_B$ of curve 40 of FIG. 2, and thus they do not appreciably affect the resonance condition.

If subsequently the control electrode of semiconductor switch 20 receives a pulse from pulse source 21, it will turn on and stay on if sufficient current is available at its anode. The principal problem at this point is to provide that switch 19 will turn off while switch 20 is turning on. This can be done if switch 19 has a minimum current value below which it will no longer present a low impedance condition. This is true of the four-layer semiconductor triodes described above. When the current of such a switch is forced below the $I_H$ value shown in curve 40 of FIG. 2, it will cease to conduct and will assume its high impedance condition. When switch 20 receives a signal from pulse source 21 to turn on, it assumes a state of very low impedance, lower than the impedance previously exhibited and even lower than its conduction impedance in the absence of the control pulse; and it thus succeeds in taking current away from switch 19. The control pulse is wide enough to outlast the induced electromotive force in section 15 which opposes the rise of current in section 15 and switch 20. Finally, the current in switch 20 increases to the point that switch 19 is left with a current below its holding current and turns off, because, as stated above, high impedance current source 17 cannot increase its output. It will further be noticed that, because of the regenerative characteristic illustrated by curve 40 of FIG. 2, after switch 20 has received its holding current, $I_H$, it remains on after the turn-on pulse has disappeared from its control electrode. Section 15 now plays a role in determining the tuning inductance.

Switching also proceeds similarly in the reverse direction. Application of a signal pulse to the control electrode of switch 19 causes it to take current away from section 15 and switch 20. The induced electromotive force of section 15 which opposes this change merely succeeds in discharging any electromagnetic energy stored in the field of section 15. The control pulse is wide enough eventually to prevail. Switch 19 receives its holding current, and switch 20 loses its holding current and turns off. Section 15 is now removed from its former role in determining the tuning inductance.

It will also be seen that any number of switches can be introduced, and thus a large number of frequency steps can be provided. The oscillator can also be turned off in a similar manner. Thus, if switch 18 receives a turn-on pulse on its control electrodes, it eventually obtains current sufficient to deprive switch 19 of its holding current and causes the latter to turn off. Switch 18 will then remain on after the turn-on pulse has disappeared from its control electrode. Since no portion of the tuning inductance is now connected across capacitor 13, the oscillator cannot oscillate. In a centralized repertory dialing system, turning the oscillator completely off periodically allows the dialing of the same digit twice or more in succession.

The pulses necessary to turn the oscillator completely off can be supplied by a clocking device within control pulse source 21 which is synchronized to generate a pulse at a fixed time after each information pulse. The fixed time is chosen so that the period before the next information pulse, during which the oscillator generates no tone, is detectable by the equipment which is actuated by the tones. This feature, although disclosed herein for completeness, is separately claimed in the concurrently filed application of G. W. Wells, Serial No. 153,908.

Figure 3:
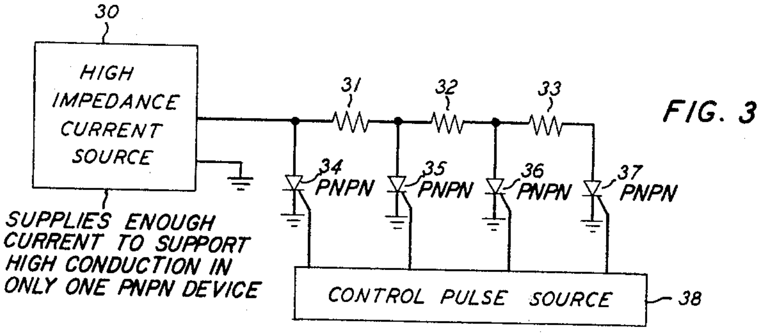
FIG. 3 is a schematic and block diagrammatic illustration of the general switching function of the invention.

The novel switching concept of the invention is also applicable to systems far removed from the production of electrical oscillations. FIG. 3 is exclusively directed to this switching function. High impedance current source 30 produces a substantially constant direct current. Connected in series with source 30 are impedance elements 31, 32, and 33, which are sections of the impedance whose reactive and resistive components it is desired to vary in steps in response to pulses from control pulse source 38. These control pulses are applied to the control electrodes of PNPN triode switches 34, 35, 36, and 37, which are interconnected to junctions with the impedance elements and are oriented to carry current from said junctions to ground. The phase angle associated with the impedance can be varied, as well as the magnitude of the impedance, since elements 31, 32, and 33 can be any combination of resistive and reactive components capable of sustaining direct-current flow. If the constant current available from source 30 is sufficient to supply the holding current for any one of PNPN triode switches 34, 35, 36, and 37 but insufficient to supply the holding current for any two of them, then, whenever one is turned on, any other switch previously conducting is turned off. Here again, a switch which is turned on and receives its holding current, designated as $I_H$ on curve 40 of FIG. 2, will remain on even after the turn-on pulse has disappeared from its control electrode because of its regenerative characteristic.

The operation for the circuit of FIG. 3 is generally the same as that described for the embodiment of FIG. 1. The net result of the coordinated switching is that the number of impedance sections between high impedance current source 30 and ground is varied, just as in FIG. 1 the number of inductive sections between source 17 and ground is varied.

In the embodiment of FIG. 3, if the regulation of source 30 is imperfect, that is, if there is some variation in the current available at the output of source 30 depending on how much impedance appears across the output of source 30, then this variation can be anticipated and compensated for by making the holding current of each switch slightly less than the holding current of the adjacent switch which is nearer to source 30. This might be done either by difference in the physical structure of the switches or by some means of biasing the control electrodes of the switches. Further, if the voltage drops across impedance sections 31, 32, and 33 are appreciable compared to the breakdown voltage, $V_B$, of the semiconductor switches, the values $V_B$ and $V_H$ shown in curve 40 of FIG. 2 can be made slightly greater for each switch whose anode is successively closer to source 30. This can be done by changing the physical characteristics from switch to switch; but the same effect might be achieved by bias in the anode-cathode circuit of each switch.

It is well known in the art that functions which can be performed with the aid of currents can be performed in an analogous manner with the aid of voltages, and that functions which can be performed with the aid of inductances can also be performed in an analogous manner with the aid of capacitances. Thus, the invention can also be practiced with bistable voltage-sensitive electrical switching devices.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. Apparatus for tuning an oscillator comprising a resonant circuit characterized by a resonant frequency and including a plurality of tuning elements, a plurality of electronic devices having first and second stable states of operation characterized by different ranges of current and voltage parameters, means for interconnecting said devices with said resonant circuit effectively to remove a portion of said tuning elements from said resonant circuit when one of said devices is operating in said first stable state to affect said resonant frequency, a source of electrical energy with means for limiting one of said parameters to a value in said range characteristic to said first stable state, said energy source being interconnected with said devices, said devices comprising a circuit arranged in a manner which characteristically permits division of said one parameter, a source of information signals, and means to impress said signals upon said one device for inducing said first stable state in said one device with a value of said one parameter approaching said limited value so that only said second stable state can be maintained in said devices other than said one device.

2. A system for converting pulse signals into tone signals, comprising a source of information pulse signals, an oscillator having a tuned circuit comprising a capacitor and a plurality of inductors, a plurality of switching devices each capable of first and second stable modes of operation characterized by different ranges of current flow and each connected across said capacitor, some of said devices being connected in series with at least one of said inductors across said capacitor, a source of direct current connected across said capacitor for supplying direct current to said devices of a value characteristic to said second stable mode to allow one of said devices to be switched from said first stable mode to said second stable mode by a pulse from said source of information pulse signals, said value being insufficient simultaneously to sustain said second stable mode in the remainder of said devices in the absence of a pulse to said remainder from said source of information pulse signals, and means for applying said pulse from said source of pulse signals to said one device.

3. An oscillator with means for varying its output frequency in steps, comprising a regenerative drive circuit and a frequency-determining circuit including a capacitor and an inductor in a plurality of series-connected sections, a plurality of PNPN semiconductor triode devices each having anode and cathode connected between two points within said frequency-determining circuit one of which is at a junction with one of said sections, a source of signal pulses, means for applying one of said pulses to a third electrode of one of said devices to induce a current transmission condition thereof, a source of direct current connected across said frequency-determining circuit, said devices comprising multiple shunt paths across said direct-current source, said source being capable of providing for said one device a conduction current which holds said one device in said current transmission condition but is insufficient simultaneously to hold any other one of said devices in said current transmission condition, and transformer means for coupling said frequency-determining circuit to said regenerative drive circuit to isolate said regenerative drive circuit from said direct current flowing in said devices.

References Cited in the file of this patent

UNITED STATES PATENTS

| | | |
|---|---|---|
| 2,215,775 | Baunfield | Sept. 24, 1940 |
| 2,296,100 | Foster et al. | Sept. 15, 1942 |
| 2,944,164 | Odell | July 5, 1960 |
| 2,995,656 | Sneath | Aug. 8, 1961 |
| 3,047,741 | Snow | July 31, 1962 |